May 27, 1930. R. E. MAXWELL 1,760,654
DEVICE FOR STIRRING FROZEN DESSERTS
Filed Oct. 16, 1929
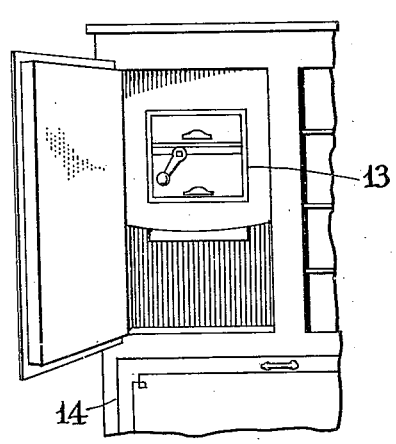
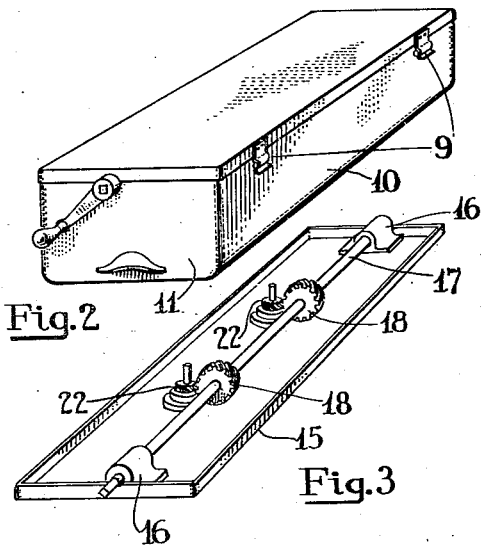
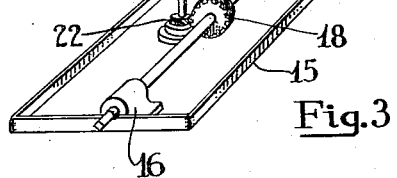
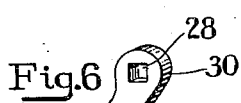
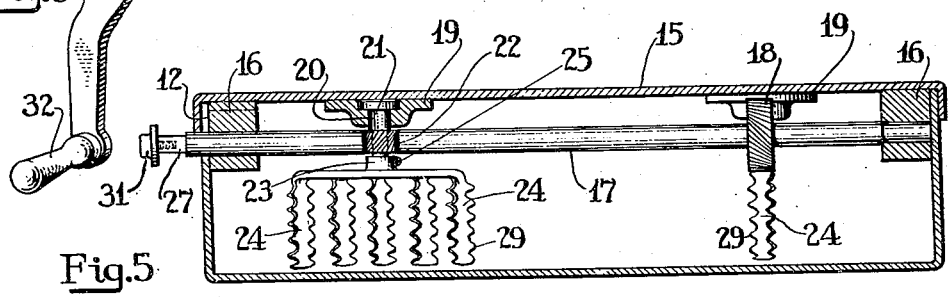
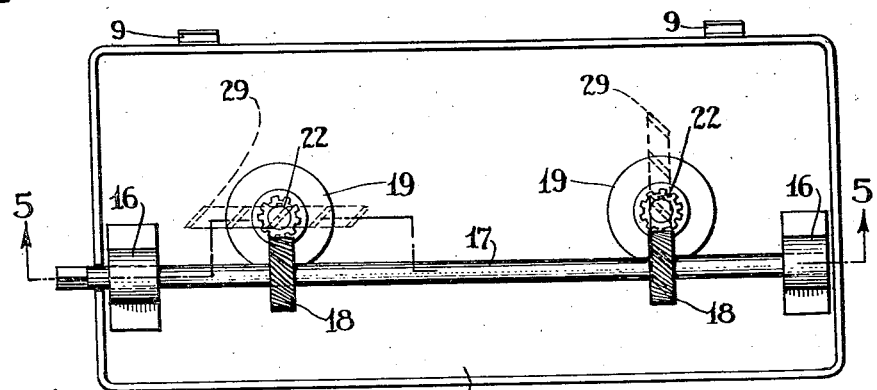
INVENTOR.
RALPH E. MAXWELL.
BY Frank H. Borden
ATTORNEY.

Patented May 27, 1930

1,760,654

UNITED STATES PATENT OFFICE

RALPH E. MAXWELL, OF MODESTO, CALIFORNIA

DEVICE FOR STIRRING FROZEN DESSERTS

Application filed October 16, 1929. Serial No. 399,907.

This invention relates to devices for stirring frozen desserts, and particularly to devices for stirring fluid materials in mechanical refrigerators during the freezing thereof.

In the production of frozen desserts in electrical refrigerators, it has become well known that the product does not compare in texture with frozen desserts as produced, for instance, in standard ice-cream freezers. The product is "grainy" and filled with ice particles, owing to the absence of agitation or stirring during freezing. This is incident to the difficulty experienced heretofore in properly stirring the mixture during its freezing. Although there are numerous factors militating against proper stirring agitation of such homemade congealed delicacies during the freezing operation, the principal deterrent seems to be the difficulty and general unpleasantness of removing the freezing pan from the refrigerator in order to stir the contents. Although it was known that stirring was essential, as previously practiced, removal of the receptacle was necessary to permit stirring, and such removal not infrequently involved spilling the contents during the operation and was never a simple or pleasant task.

Among the objects of this invention are: to provide a freezing pan of improved construction; to provide a unitary top for a freezing pan enabling the efficient stirring of the contents of the pan; to provide a receptacle for freezing desserts in an electrical refrigerator or the like, by means of which the contents may be thoroughly and properly agitated and stirred without removal from the refrigerator; to improve the construction of stirring devices; and many other objects and advantages as will become more apparent as the description proceeds.

In the preferred illustrative form, the invention comprises a relatively shallow tray with a removable lid supporting one or more shallow stirring devices extending into the tray and with the lid carrying driving mechanism for the stirrers operable from the exposed end of the tray.

In the accompanying drawings:

Fig. 1, represents a fragmentary elevation of the device in a freezing compartment of a refrigerator, Fig. 2, represents a perspective view of the combination freezing pan and stirring device, Fig. 3, represents a perspective of the removable lid or cover of the device disclosing the arrangement of the paits, Fig. 4, represents a bottom plan of the lid of the device, Fig. 5, represents a vertical section through the lid and stirring mechanism taken on line 5—5 of Fig. 4, and Fig. 6, represents a perspective of the removable crank for the stirring mechanism.

As is well known, electrical and other forms of refrigerators provide in one form or another for the freezing of water in the form of ice cubes, in pans or trays which are slidably supported in a location, in the refrigerator, proper for such freezing action. This invention contemplates the provision of a tray or receptacle of relatively shallow depth such as can be substituted for one or more of the conventional ice cube freezing trays, although as will be pointed out, it is within the contemplation of this invention that a standard ice cube pan may be availed of for the purpose.

The tray or receptacle comprises a relatively shallow box 10, of such size and shape as to fit in the conventional racks of an automatic refrigerator or the like. The front end wall 11, thereof, is provided with a vertical U shaped slot extending from its upper edge, as at 12. The tray or pan is slidably received in the freezing chamber 13, of a refrigerator 14, in the space normally filled by the ice cube forming trays or pans. Removably mounted upon the upper edges of the side walls of the receptacle 10, is the detachably connected lid 15, supporting the stirring devices and their actuating mechanism. The lid may be clamped detachably to the pan in any desired manner, as by clamps 9, at the sides or ends of the receptacle and lid. This lid or cover 15 has gudgeons or journals 16 at opposed ends arranged to rotatably support the longitudinally extending rotatable shaft 17. The gudgeons and shaft are preferably offset laterally from the longitudinal center of the cover and carry worm wheels or gears 18. Riveted or welded to the inner surface of the tray, substantially coincident with its longitudinal axis, are the collars 19, having vertical concentric openings 20, in which short stub shafts or shanks 21 are rotatably mounted. Each stub shaft 21 carries a small worm or gear 22 in mesh with the respective worm or gear 18 on shaft 17, in such manner that rotation of shaft 17 rotates stub shafts 21 in synchronism. Removably mounted on the lower end of the stub shafts 21 are the stirrers 23 having stirring fingers 24 arranged to stir and otherwise agitate the contents of receptacle 10 upon rotation of the shaft 17. Each finger may have protuberances or extended flanges 29 to facilitate the mixing and each finger or blade is preferably set at an angle to its arc of rotation for the same purpose. Each stirrer or paddle is arranged for detachment for purposes of cleaning and the like, as by the provision of a set screw 25, removably locking the stirrer to the stub shaft 21. If desired a housing (not shown) may be provided for the shaft and gearing.

Shaft 17 continues beyond the front edge of the lid 15, lying in the U shaped groove 12, and terminates, preferably, in a square shank 27 such as to slidably receive the square or angular opening 28 in the crank 30. Although it is preferred that the crank be susceptible to quick and easy attachment and removal, yet under certain conditions it may be desired to let it remain in driving relation to shaft 17, for which purpose a threaded plug, or the like, 31 is provided on the end of shaft 17. The crank 30 has a handle 32 for manual grasp by the operator.

In practice the receptacle 10 is filled with the fluid to be frozen, to a level below the bottom edge of the U shaped slot 12, the lid 15 carrying the stirring devices and their driving mechanism is clamped on the receptacle 10, with the stirrers depending downwardly into the mixture, and the whole slid longitudinally into the freezing compartment of a refrigerator, such as 14. The stirring or agitating of the fluid is not usually necessary until the fluid has become sufficiently chilled, which may require approximately one hour. During this time the handle or crank 30 may be disposed on the squared shank 27 of the shaft 17, or not as desired, and according to the amount of room available in the refrigerator. From time to time after the fluid has become chilled, and after the actual freezing begins, the operator may open the refrigerator door and give a few turns to the crank which obviously rotates the shaft 17 and simultaneously and synchronously rotates the stirring devices 23 with their fingers 24 immersed in the fluid. This stirring or agitating is performed in place in the freezing compartment without removing the receptacle from the compartment, as to a nearby table, as is necessary with previous practices. When the mixture begins to harden after the initial freezing, the receptacle may be slid outwardly in its compartment and the lid and the stirring mechanism carried thereby, may be bodily removed by unclamping the clamps 9, or the like. The receptacle may then be left uncovered or may be covered by the auxiliary lid to protect the contents of the receptacle as it is slid into the compartment again to remain until its removal for use. Clearly also the stirring devices may be removed from their shafts and the same lid may then be replaced during the finishing of the freezing of the mixture, if desired.

It will be understood that the size and length of the stirring devices will be proportioned to the size and depth of the pans, an important characterstic of the splashers or stirrers is that they may be made quite shallow to accord with the depths of the shallow pans normally used in the relation.

Obviously many changes may be resorted to in the elements and combination of elements recited herein, without departing in any way from the spirit of the invention. For instance, it is contemplated that the actuating mechanism need not be manual but may be mechanical or electrical and automatic in any preferred form (not shown). It is contemplated also that the shafting may, if desired, be placed outside of the lid to which it may be affixed or disposed between the lid and a false lid concealing the shafting (not shown). Obviously there may be as many stirring devices as may be desired whether one or more, and the axial extent of their fingers will be dependent upon the shallowness of the receptacle or pan with which they are to be associated.

Moreover, the various elements recited may be made of any materials and forms required.

It is an important feature of the invention that the stirring mechanisms and their supporting actuating mechanisms, may be provided as units for attachment and use with any standard pan or receptacle now before the public.

I claim as my invention:

1. In a freezing drawer for domestic refrigerators, a lid closely fitting and removably mounted on said drawer, a horizontal shaft and gearing mounted on the inner side of said lid and said shaft terminating in a shank beyond the edge of the lid, stirring devices rotatably mounted on the inner side of said lid and extending inwardly toward the bottom of the drawer in mesh with the gearing, means for manually turning said shaft.

2. The combination with a slidable freezing drawer for domestic refrigerators, a lid for the drawer, a stirring device rotatably mounted on the inner side of the lid and comprising a hub and radially extending axially curved fingers terminating in a plane substantially parallel to the bottom of the drawer but spaced therefrom so as to avoid contact, and means operable to rotate the stirring device.

3. A device for retaining, agitating and freezing fluids in domestic refrigerator compartments, comprising a drawer adapted to slide within said compartments, and agitating means supported wholly within the confines of said drawer and having its operating shaft extending parallel with the bottom of the drawer and through an end of said drawer.

4. In a drawer for domestic refrigerators, a lid closely fitting said drawer, a horizontal shaft journaled on the inner side of said lid and adapted to extend through a slot in the end wall of said drawer, and agitating means journaled on the inner side of said lid and having operating connection with said shaft.

Signed at Modesto, county of Stanislaus, and State of California, this 7th day of October, 1929.

RALPH E. MAXWELL.